United States Patent
Nilsson et al.

[11] Patent Number: 6,018,532
[45] Date of Patent: *Jan. 25, 2000

[54] METHOD FOR MULTIPLEXING ADJACENT TRANSCEIVER/TRANSCODER LINKS INTO A SINGLE TIMESLOT

[75] Inventors: Torsten Nilsson, Hästveda; Kenth Andersson, Sollentuna; Johan Granath, Stockholm; Anders Bergström, Mölndal, all of Sweden

[73] Assignee: Telefonaktiebolget L M Ericsson (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/748,756

[22] Filed: Nov. 14, 1996

[51] Int. Cl.$^7$ ........................................ H04J 3/04
[52] U.S. Cl. ............................... 370/535; 370/336
[58] Field of Search ...................... 370/347, 468, 370/477, 337, 296, 336, 465, 535, 350

[56] References Cited

U.S. PATENT DOCUMENTS

| | | |
|---|---|---|
| 5,111,454 | 5/1992 | Hung et al. . |
| 5,430,724 | 7/1995 | Fall et al. ................................. 370/79 |
| 5,475,686 | 12/1995 | Back et al. .............................. 370/84 |
| 5,506,837 | 4/1996 | Sollner .................................... 370/31 |
| 5,519,702 | 5/1996 | Takahashi . |
| 5,555,260 | 9/1996 | Rinnbäck et al. . |
| 5,612,992 | 3/1997 | Dupuy et al. ............................ 379/59 |

FOREIGN PATENT DOCUMENTS 0479768  8/1992  European Pat. Off. .

*Primary Examiner*—Chi H. Pham
*Assistant Examiner*—Kim T. Nguyen
*Attorney, Agent, or Firm*—Jenkens & Gilchrist, P.C.

[57] ABSTRACT

An improved method and apparatus for transmitting data between a transceiver and transcoder pair of a cellular radio system is disclosed. A pair of transceiver-transcoder-links normally transmitted on two separate channels are broken into a series of four bit data segments which are multiplexed together into series of eight bit timeslots for transmission between a transceiver and a transcoder pair.

20 Claims, 4 Drawing Sheets

METHOD FOR MULTIPLEXING ADJACENT TRANSCEIVER/TRANSCODER LINKS INTO A SINGLE TIMESLOT

BACKGROUND OF THE INVENTION

1. Technical Field of the Invention

The present invention relates to radio frequency communication systems, and more particularly, to the transmission of data between transceiver/transcoder pairs.

2. Description of Related Art

Prior art digital cellular systems employing time division multiple access (TDMA) carriers offer distinct advantages over analog cellular systems in both system capacity and electrical performance. In a TDMA system, two or more channels of information are transmitted over the same link by allocating a different time interval for the transmission of each channel. For RF digital cellular systems, each time interval (message channel) contains coded speech (or data) for one traffic channel (voice channel).

Common to all RF digital cellular systems is transcoding which essentially transforms high bit rate speech data into high quality synthesized speech at low bit rates. Transmission of the transcoded data to a mobile station occurs after transmission of the data from a transcoder to a transceiver unit. The interconnections between the transcoders and transceivers utilize a great deal of the system resources, and the ability to more efficiently transfer this data between the transcoder and transceiver would greatly benefit the providers of cellular services.

One scheme utilizes specialized compression and decompression equipment associated with the transceiver and transcoder to compress information from a plurality of message channels for transmission on a single TDMA information block. The compression equipment inserts synchronization into the information block and conveys the block in a timeslot between the transcoder and the transceiver. This information may then be transmitted over a radio carrier frequency. This system involves a great deal of complexity due to the specialized compression/decompression equipment at the transcoder and transceiver and the requirements for synchronizing the end points of the compressed data block into which the compressed message channels are located. A more simplified method for reducing transmission requirements between a transcoder and transceiver would be greatly beneficial.

SUMMARY OF THE INVENTION

The present invention overcomes the foregoing and other problems with a system and method for transmitting information between a transcoder within a mobile switching center and a transceiver within a base station of a cellular system in a manner that significantly reduces the transmission resource requirements. A first and second transceiver/transcoder pairs are located within a base station and mobile switching center respectively. The transceiver/transcoder pairs include first and second logical transceiver-transcoder-links between them. During a first mode of operation, these first and second transceiver-transcoder-links are transmitted between the transceiver/transcoder pairs via two separate eight bit timeslots. However, an increased multiplexing function may be utilized during a second mode of operation wherein the transceiver-transcoder-links of the two transceiver/transcoder pairs are multiplexed together into a single channel such that both the first and the second transceiver/transcoder pairs are interconnected through a single eight bit timeslot.

Multiplexors are associated with each transceiver in an associated radio transmit terminal and integrated into the hardware and software of the transcoders. The multiplexors multiplex a four bit data segment of the first transceiver/transcoder pair and a four bit data segment from the second transceiver/transcoder pair into the single eight bit timeslot. The four bit segment from the second transceiver/transcoder pair is delayed by four bits such that it will be stored within the least significant bit position of the eight bit timeslot while the four bit segment from the first transceiver/transcoder pair is stored in the most significant bit position of the eight bit timeslot. When the timeslot is received, the multiplexing equipment may then demultiplex the eight bit timeslot into the separate four bit segments associated with the receiving transcoder or transceiver. The increased multiplexing functionality does not require the use of any special synchronization to the transceiver/transcoder pairs, nor is there a need for any specialized compression equipment.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
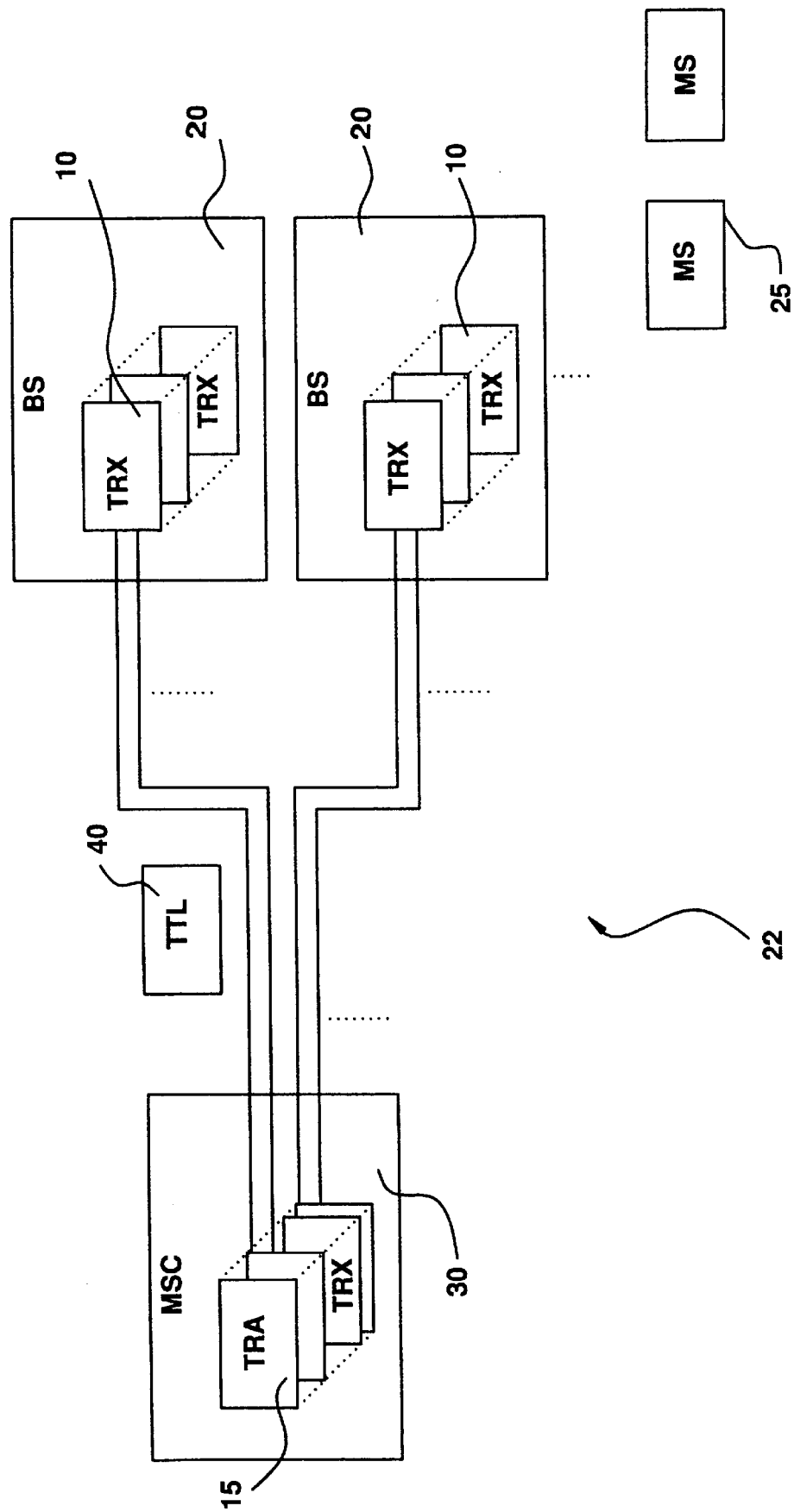
FIG. 1 illustrates the logical links between the transcoders and transceivers.

Referring now to the Drawings, and more particularly, to FIG. 1, there is illustrated a block diagram of the transceiver (TRX) 10 and transcoder (TRA) 15 pairs and the logical links between them. Each transceiver 10 and transcoder 15 pair can handle three air timeslots at full-rate or six air timeslots at half-rate. One full-rate air timeslot carries one control channel, one VSELP coded speech channel or one fax/modem data channel. Half-rate air timeslots carry one PSI-CELP coded speech channel. Transceivers 10 are physically located at one of a plurality of base station 20 located within a public land mobile network 22. The transceiver 10 handles communications between a base station 20 and a plurality of mobile stations 25. The base station 20 converts coded speech to/from radio signals which are exchanged with the mobile stations 25.

The transcoder 15 is located in a mobile service switching center (MSC) 30. The MSC 30 is associated with a number of base stations 20. The transcoder 15 converts between the PCM coded speech and data received from a public switched telephone network (PSTN) a public land mobile network (PLMN) 22 and coded digital information used by the transceiver. One transceiver 10 and transcoder 15 are connected to each other via a 64 kbps timeslot in the plesiochronous (transmission network) digital hierarchy. While the present invention is described with 64 kbps timeslot, other size timeslots may also be used. The 64 kbps timeslot carries one transceiver-transcoder-link (TTL) 40 for handling speech and/or data channels transmitted between the two units according to the prior art system and method. The transceiver-transcoder-link 40 carries data between the transcoder 15 and the transceiver 10. The data consists of VSELP coded speech, PSI-CELP coded speech data or fax/modem data.

Figure 2:
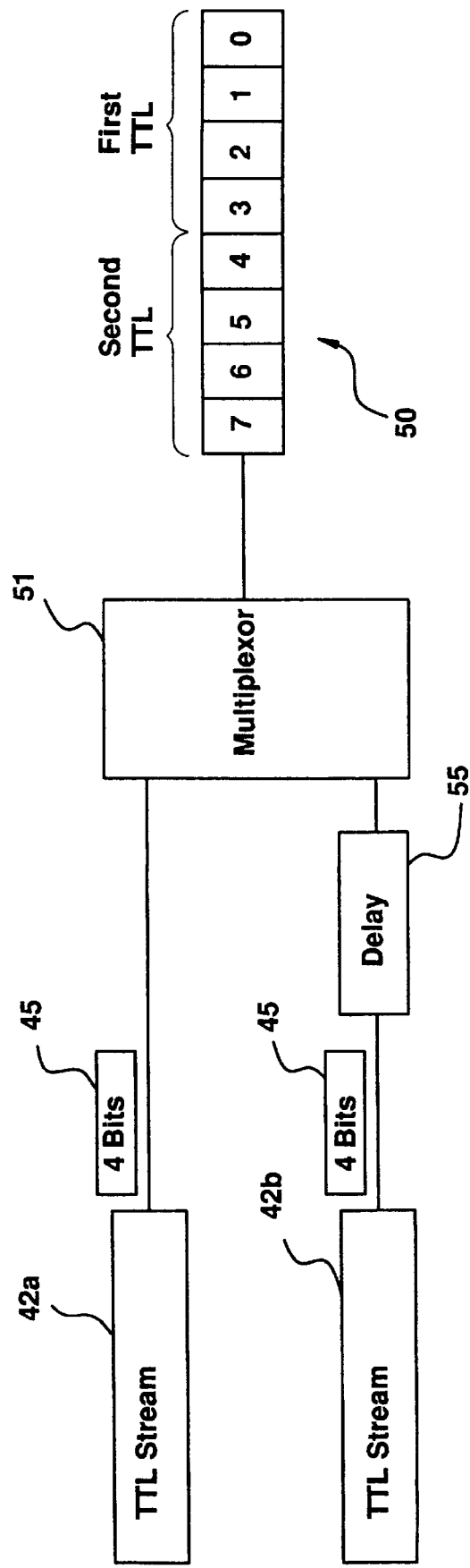
FIG. 2 is a diagram illustrating the generation of a 64 kbps timeslot including data from two adjacent transceiver-transcoder-links.

By multiplexing the logical links between transceiver 10 and transcoder 15 pairs into a single physical channel (64 kbps or other size timeslot), the transmission requirements for the system are halved. This is accomplished using an increased multiplexing function. The multiplexing of the 64 kbps timeslot 50 is accomplished (as shown in FIG. 2) by taking a pair of TTL streams 42 from either a transceiver 10 or transcoder 15 and multiplexing one segment 45 (in the preferred embodiment, a 4 bit data segment) from each stream into a single predetermined length timeslot 50. In the preferred embodiment, the timeslot is 8 bits long. The actual multiplexing may be performed by multiplexors 51 associated with existing devices (RTT) 65, or integrated into the devices themselves. In the preferred embodiment, the multiplexors 51 on the transceiver side are connected within the radio transceiver terminal (RTT) 65 while the multiplexors 51 on the transcoder side are integrated within the transcoder hardware and software.

A first segment 45 from the first TTL stream 42*a* is located in the most significant bit position of the timeslot 50. The second segment 45 from the second TTL stream 42*b* is delayed at 55 by the length of the first segment in order to store the segment within the least significant bits of the timeslot 50. In the preferred embodiment the first and the second segments are 4 bits long (a "nibble"). However, the segments may be of varying lengths and need not each be of the same length so long as the segments fill the timeslot. Alternatively, rather than multiplexing together only segments from two data streams, segments from any number of streams can be multiplexed together. This procedure enables the information from the transceiver-transcoder-links 40 to be transmitted over the single 64 kbps timeslot 50.

Since the multiplexing is done directly between the transceiver 10 and transcoder 15, a significantly modified data transfer protocol is not required. There are only two requirements for the TRX and TRA communications protocol to control data transfers between the TRXs 10 and TRAs 15. First, in the preferred embodiment, the protocols shall be in a nibble format rather than octet format, and second, in case of serial transmission, the protocols shall include a slight delay of the data stream from the second transceiver/transcoder pair in each multiplexed transceiver-transcoder-link. By operating in this manner, the remote multiplexing ends need not be synchronized, thus, presenting a simplified procedure for transmission requirements.

Figure 3:
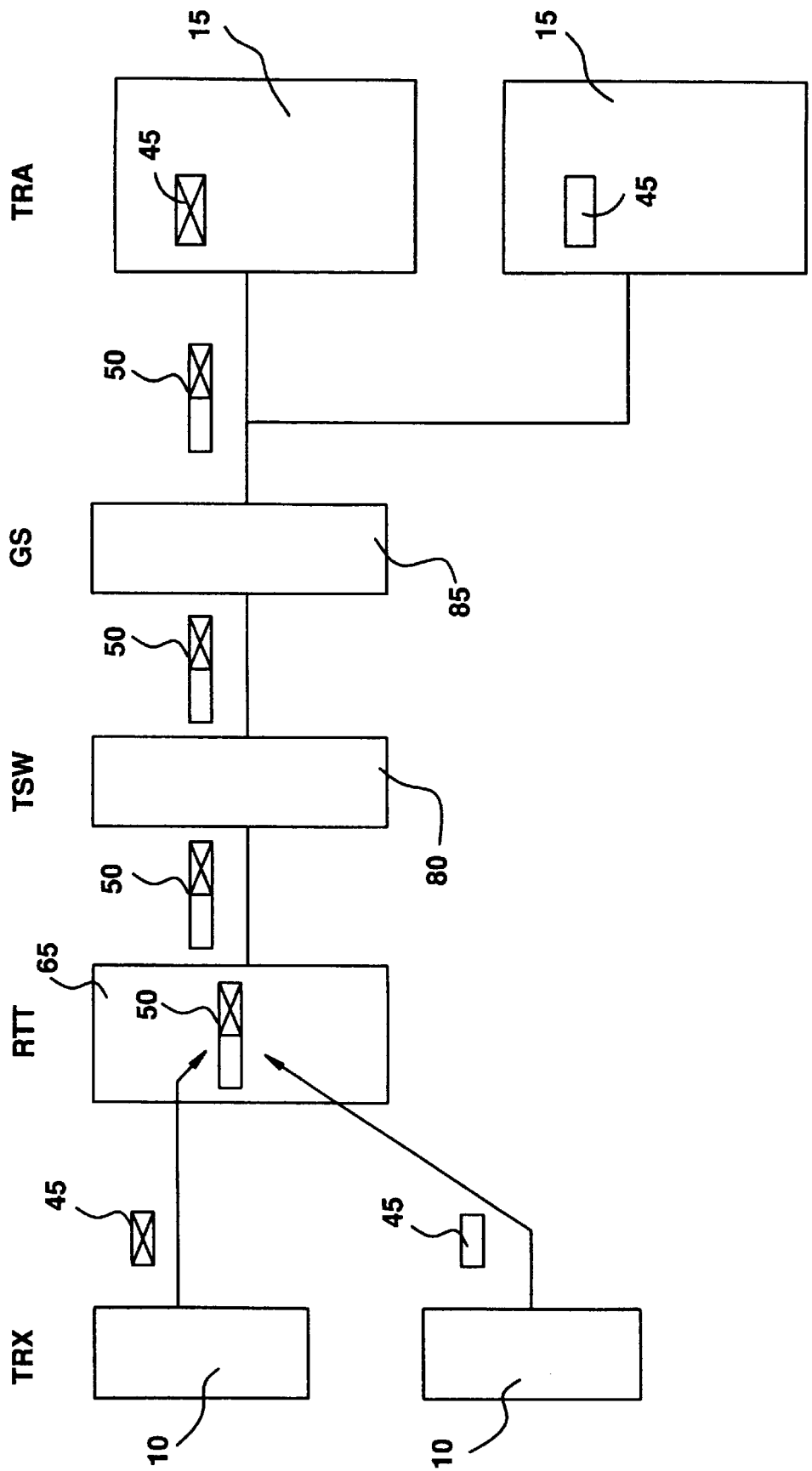
FIG. 3 illustrates the configuration of the 64 kbps timeslot as it passes through various portions of the system.

Referring now to FIG. 3, there is illustrated the general data flow between a transceiver 10 and a transcoder 15 using the method of the present invention. As discussed previously, the first data segments 45 from a pair of data streams 42 are multiplexed together within the RTT 65 into a timeslot 50 with the bits from one of the streams being delayed, such that it is located in the least significant bit position of the timeslot. The timeslot 50 is then transmitted through a timing switch 80 and a group switch 85 to the transcoders 15 associated with the transceivers 10. The transcoders 15 internally demultiplex the timeslot 50 back into the first and second segments 45 associated with each transcoder.

Figure 4:
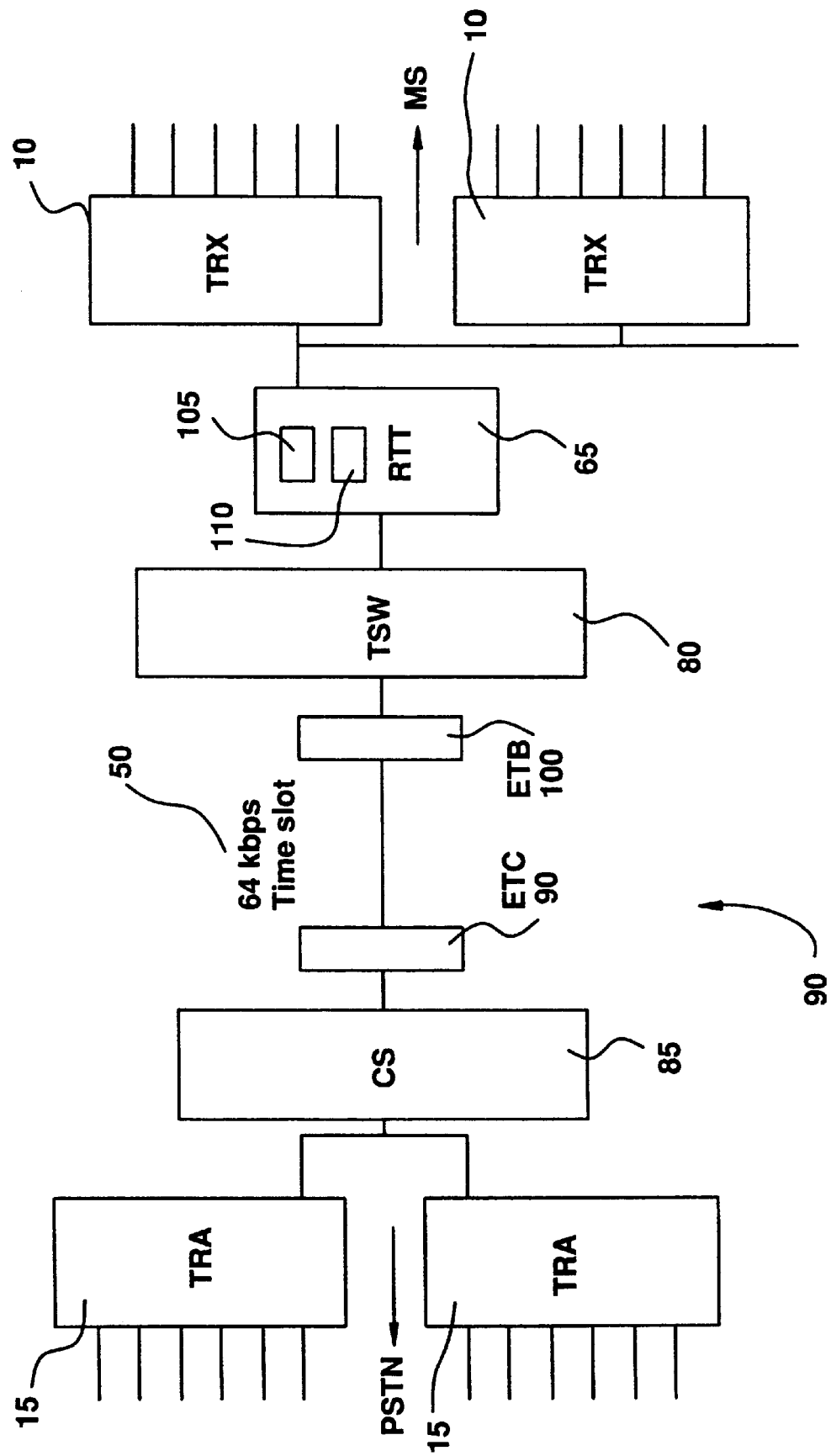
FIG. 4 illustrates the physical connection between the transcoder and transceiver.

Referring now to FIG. 4, there is illustrated the physical links between a transceiver pair 10 and a transcoder pair 15. The description of FIG. 4, while providing a discussion of the preferred embodiment of the transmission scheme between the transceiver and transcoder is not illustrative of the scheme compatible with the present invention. The transceiver-transcoder-links 40 (FIG. 1) that are multiplexed together pass through a transceiver-transcoder-physical-link (TTPL) 90 between the transceiver pairs 10 and transcoder pairs 15. The TTPL 90 carries one TTL 40 when increased multiplexing is not used and two TTLs when utilizing increased multiplexing. The transcoder 15 is connected to the group switch 85 using a digital link number two (DL2) physical interface and an SNT logical interface.

Within the group switch 85, the TTPL 90 is treated as a semi-permanent pathway between the DL2 interface and the physical interface exchange terminal circuit (ETC) 95. Alternatively, a switched pathway may also be used within the group switch. The ETC 95 provides a connection to the 64 kbps timeslot 50 interconnecting the transceiver 10 and transcoder 15. The timeslot 50 is connected at its other end to the exchange terminal board (ETB) 100 at a base station 20 containing an associated transceiver 10. The route of the 64 kbps timeslot between the ETC 95 and ETB 100 is normally not known since the connection is provided by a line leased from a network operator.

The timing switch 80 provides a semi-permanent pathway between the ETB 100 and the RTT 65. The connection between the transceiver 10 and the RTT 65 is a 24-channel PCM connection. The connection is divided into one control timeslot and one timeslot containing the TTL 40. The interface between the different transceiver 10 and the RTT 65 is independent of the position of the transceiver in the transceiver cabinet. Thus, there shall be no configuration of a transceiver interface specific to particular position in the transceiver cabinet.

In an alternative embodiment, by including within the RTT a processor 105 and a digital signaling link 110, the increased multiplexing function can be remotely controlled. With such remote control, it is not necessary to personally be on the base station 20 when switching between multiplexing and increased multiplexing modes.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for transmitting information between a pair of transceivers and a pair of transcoders having a pair of logical transcoder lies (TTL) data streams therebetween over a single physical channel, comprising the steps of:

extracting a first data segment from the first logical TTL data stream between the transceiver/transcoder pairs and a second data segment from the second logical TTL data stream between the transceiver/transcoder pairs;

multiplexing the first and second data segments into a single timeslot of the single physical channel interconnecting the transceiver/transcoder pairs;

transmitting the timeslot between the pair of transcoders and pair of transceivers over the single physical channel;

demultiplexing the transmitted timeslot into the first and second data segments.

2. The method of claim 1 wherein the step of multiplexing further comprises the steps of:

placing the first data segment in a most significant bit position of the timeslot;

delaying the second data segment by a length of the first data segment; and placing the second data segment in a least significant bit position of the timeslot.

3. The method of claim 1 wherein the step of extracting further comprises the step of formatting the single channel between a transceiver and a transcoder in a four-bit format.

4. The method of claim 1 further including the step of remotely controlling multiplexing and demultiplexing of the timeslot.

5. The method of claim 1 wherein the first and the second data segments are four bits in length.

6. The method of claim 5 wherein the timeslot is eight bits in length.

7. The method of claim 1 wherein the first and second data segments are of different lengths.

8. A system for transmitting information between a mobile switching center and a base station comprising:

first and second transcoders located within the mobile switching center for converting between PCM coded information and coded digital information wherein the coded digital information is formatted in four-bit segments;

first and second transceivers located within the base stations for converting between coded digital information and radio signals wherein the coded digital information is formatted in four-bit segments;

a single physical communications link interconnecting the first and second transcoders with the first and second transceivers respectively for transmitting an 8-bit timeslot therebetween;

means associated with the first and second transceivers for multiplexing and demultiplexing between first and second four-bit segments associated with first and second logical transceiver transcoder link data streams between the first and second transcoders and the first and second transceivers and the eight-bit timeslot associated with the single physical communications link; and means associated with the first and second transcoders for multiplexing and demultiplexing between the eight-bit timeslot associated with the single physical communications link and the first and the second four-bit segments associated with first and second logical transceiver-transcoder-link data streams between the first and second transcoders and the first and second transceivers.

9. The system of claim 8 further including means for delaying the second four bit segment during multiplexing.

10. The system of claim 9 wherein the means for multiplexing further places the first four bit segment in most significant bits of the timeslot and the delayed second four bit segment in the least significant bits of the timeslot.

11. The system of claim 8 wherein the first and second means for multiplexing and demultiplexing may be selectively activated.

12. The system of claim 8 wherein the first means for multiplexing and demultiplexing comprises:

a radio transceiver terminal for interconnecting the first and second transceivers with the means for transmitting; and a multiplexor within the radio transceiver terminal for multiplexing between the first and second four bit segments and the timeslot.

13. The system of claim 12 wherein the means for transmitting comprises:

a timing switch connected to the radio transceiver terminal for interconnecting the transceiver-transcoder-link;

an exchange terminal board connected to the timing switch for the transceiver-transcoder-link;

an exchange terminal circuit connected to the exchange terminal board through a leased line; and a-group switch for interconnecting the transcoder with the exchange terminal circuit.

14. The system of claim 8 wherein the second means for multiplexing is integrated within hardware and software of the decoder.

15. A system for transmitting information between a mobile switching center and a base station, comprising:

a first transceiver/transcoder pair having a first logical transceiver-transcoder-link (TTL) data stream defined therebetween;

a second transceiver/transcoder pair having a second logical transceiver-transcoder-link (TTL) data stream defined therebetween; and selectively activated means for multiplexing logical transceiver-transcoder-links from the first and the second logical transceiver-transcoder-link data streams into a single physical channel between the first and the second transceiver/transcoder pairs.

16. The system of claim 15 wherein the selectively activated means multiplexes four-bit segments from the first and the second (TTL) data stream into a single eight-bit timeslot.

17. The system of claim 16 wherein the selectively activated means delays one of the four bit segments by four bits such that the delayed four bit segment is multiplexed into the least significant bits of the eight bit timeslot.

18. The system of claim 15 wherein the selectively activated means comprises:

first means for multiplexing integrated within the hardware and software of the transcoder; and second means for multiplexing connected to the transceiver.

19. The system of claim 18 wherein the second means for multiplexing comprises:

a radio transceiver terminal; and a multiplexor within the radio transceiver terminal for multiplexing between the first and second four bit segments and the eight bit timeslot.

20. A method for transmitting information between a plurality of transceivers and a plurality of transcoders wherein the transceivers and transcoders are associated in pairs, comprising the step of:

extracting data segments from a first logical transceiver-transcoder-link (TTL) data stream between a first transceiver/transcoder pair and from a second logical transceiver-transcoder-link data stream between a second transceiver/transcoder pair wherein each data segment includes a TTL associated with one of the first and second transceiver/transcoder pairs;

multiplexing the data segments into a timeslot of a single communications link interconnecting each of the plurality of transceiver/transcoder pairs;

transmitting the timeslot between the transceiver/transcoder pairs over the single communications link; and demultiplexing the transmitted timeslot into the extracted data segments to each of the transceiver/transcoder pairs.

* * * * *

UNITED STATES PATENT AND TRADEMARK OFFICE
CERTIFICATE OF CORRECTION

PATENT NO. : 6,018,532

DATED : January 25, 2000

INVENTOR(S) : Nilsson et al.

It is certified that error appears in the above-identified patent and that said Letters Patent is hereby corrected as shown below:

| | |
|---|---|
| Column 4, line 53 | Replace "lies" With --links-- |
| Column 6, line 7 | Replace "a-group" With --a group-- |
| Column 6, line 49 | Replace "." With --:-- |

Signed and Sealed this

Twenty-ninth Day of May, 2001

Attest:

NICHOLAS P. GODICI

Attesting Officer     Acting Director of the United States Patent and Trademark Office